United States Patent
Wu et al.

(10) Patent No.: US 12,041,615 B2
(45) Date of Patent: Jul. 16, 2024

(54) COMMUNICATION OF UPLINK CONTROL INFORMATION

(71) Applicant: Nokia Technologies Oy, Espoo (FI)

(72) Inventors: Chunli Wu, Beijing (CN); Samuli Turtinen, Ii (FI); Benoist Sebire, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 211 days.

(21) Appl. No.: 17/430,406

(22) PCT Filed: Feb. 13, 2019

(86) PCT No.: PCT/CN2019/074999
§ 371 (c)(1),
(2) Date: Aug. 12, 2021

(87) PCT Pub. No.: WO2020/164029
PCT Pub. Date: Aug. 20, 2020

(65) Prior Publication Data
US 2022/0110144 A1    Apr. 7, 2022

(51) Int. Cl.
*H04W 72/21* (2023.01)
*H04W 72/23* (2023.01)
(Continued)

(52) U.S. Cl.
CPC ........... *H04W 72/21* (2023.01); *H04W 72/23* (2023.01); *H04W 72/535* (2023.01); *H04W 72/569* (2023.01)

(58) Field of Classification Search
CPC ... H04W 72/21; H04W 72/23; H04W 72/535; H04W 72/569; H04W 72/1268; H04W 72/05; Y02D 30/70
See application file for complete search history.

(56) References Cited

U.S. PATENT DOCUMENTS

2009/0318152 A1    12/2009    Maheshwari
2012/0057547 A1    3/2012    Lohr et al.
(Continued)

FOREIGN PATENT DOCUMENTS

CN    102415187 B    4/2012
CN    103098398 A    5/2013
(Continued)

OTHER PUBLICATIONS

CATT, "Discussion on BSR Transmission and Cancellation", 3GPP TSG-RAN WG2 Meeting #99, R2-1707919, (Aug. 21-25, 2017), 3 pages.
(Continued)

*Primary Examiner* — Kyaw Z Soe
(74) *Attorney, Agent, or Firm* — ALSTON & BIRD LLP

(57) ABSTRACT

Example embodiments relate to communication of uplink control information. A method implemented at a terminal device comprises obtaining a plurality of uplink grants available for uplink transmission to a network device, the plurality of uplink grants indicating resources for the uplink transmission; determining prioritization of the plurality of uplink grants in transmission of uplink control information based on a predetermined prioritization policy; and selecting, based on the determined prioritization, an uplink grant from the plurality of uplink grants for transmission of the uplink control information to the network device. In such a way, it is possible to increase a probability of transmission of the uplink control information and/or a probability of improving power efficiency of the terminal device.

32 Claims, 3 Drawing Sheets

(51) Int. Cl.
*H04W 72/50* (2023.01)
*H04W 72/566* (2023.01)

(56) References Cited

U.S. PATENT DOCUMENTS

| | | | |
|---|---|---|---|
| 2013/0039321 A1 | 2/2013 | Kim et al. | |
| 2013/0114461 A1 | 5/2013 | Seo et al. | |
| 2014/0161108 A1 | 6/2014 | Lohr et al. | |
| 2014/0362780 A1 | 12/2014 | Malladi et al. | |
| 2017/0238342 A1 | 8/2017 | Yang et al. | |
| 2017/0245294 A1 | 8/2017 | Worrall et al. | |
| 2017/0265176 A1 | 9/2017 | Marinier et al. | |
| 2017/0303289 A1 | 10/2017 | Guo et al. | |
| 2018/0176937 A1 | 6/2018 | Chen et al. | |
| 2018/0263026 A1 | 9/2018 | Loehr et al. | |
| 2019/0037582 A1 | 1/2019 | Noh et al. | |
| 2019/0159229 A1 | 5/2019 | Yi et al. | |
| 2019/0335448 A1 | 10/2019 | Yang | |
| 2021/0307027 A1* | 9/2021 | Kung | H04W 72/569 |
| 2021/0315018 A1* | 10/2021 | Baek | H04L 1/1812 |
| 2021/0400713 A1* | 12/2021 | He | H04W 72/21 |
| 2022/0095332 A1* | 3/2022 | Li | H04W 72/23 |

FOREIGN PATENT DOCUMENTS

| | | |
|---|---|---|
| CN | 107079473 A | 8/2017 |
| CN | 107852746 A | 3/2018 |
| CN | 108886818 A | 11/2018 |
| CN | 109076591 A | 12/2018 |
| EP | 2244515 A1 | 10/2010 |
| EP | 2429251 A1 | 3/2012 |
| EP | 3244677 A1 | 11/2017 |
| RU | 2474076 C2 | 1/2013 |
| WO | WO 2017/051397 A1 | 3/2017 |
| WO | WO 2017/171912 A1 | 10/2017 |
| WO | WO 2018/031638 A1 | 2/2018 |
| WO | WO 2018/120160 A1 | 7/2018 |

OTHER PUBLICATIONS

CATT, "Discussion on Intra-UE Multiplexing Scenarios", 3GPP TSG RAN WG1 Ad-Hoc Meeting #1901, R1-1900337, (Jan. 21-25, 2019), 10 pages.
Ericsson, "Prioritization in Mac", 3GPP TSG-RAN WG2 #98, R2-1704398, (May 15-19, 2017), 4 pages.
Extended European Search Report for European Application No. 19915130.9 dated Aug. 18, 2022, 11 pages.
First Examination Report for Indian Application No. 202127040303 dated Aug. 11, 2022, 6 pages.
Intel Corporation, "Interaction Between CAT-4 LBT Priority Class and LCP", 3GPP TSG-RAN WG2 #95, R2-164839, (Aug. 22-26, 2016), 5 pages.
Office Action for Canadian Application No. 3,129,594 dated Oct. 5, 2022, 4 pages.
Office Action for Chilean Application No. 202102116 dated Nov. 14, 2022, 32 pages.
Office Action for Japanese Application No. 2021-547105 dated Dec. 12, 2022, 7 pages.
Office Action for Taiwanese Application No. 110143154 dated Nov. 2, 2022, 16 pages.
Samsung, "UL Scheduling for eLAA", 3GPP TSG-RAN WG2 Meeting #93bis, R2-162394, (Apr. 11-15, 2016), 3 pages.
Wilus Inc., "Remaining Issues on HARQ-ACK Transmission on CA", 3GPP TSG RAN WG1 Meeting #94, R1-1809323, (Aug. 20-24, 2018), 9 pages.
Wilus Inc., "UL Intra-UE Transmission Prioritization and Multiplexing for NR URLLC", 3GPP TSG RAN WG1 Ad-Hoc Meeting 1901, R1-1901013, (Jan. 21-25, 2019), 4 pages.
International Search Report and Written Opinion for Patent Cooperation Treaty Application No. PCT/CN2019/074999 dated Oct. 29, 2019, 10 pages.
Abu-Ali et al., "Uplink Scheduling in LTE and LTE-Advanced: Tutorial, Survey and Evaluation Framework", IEEE Communications Surveys & Tutorials, vol. 16, No. 3, (Dec. 18, 2013), pp. 1239-1265.
Samsung Electronics, "Msg3 Handling for Switching from CBRA to CFRA", 3GPP TSG-RAN2 103bis, R2-1815872, (Oct. 8-12, 2018), 4 pages.
Nokia et al., "Revised SID: Study on NR Industrial Internet of Things (IoT)", 3GPP TSG RAN meeting #81, RP-182090, (Sep. 10-13, 2018), 5 pages.
Examination Report for Australian Application No. 2019428744 dated Jun. 29, 2022, 3 pages.
Notice of Allowance for Taiwanese Application No. 109104253 dated Aug. 18, 2021, 4 pages.
Office Action for Russian Application No. 2021126817/(056621) dated Apr. 21, 2022, 13 pages.
Office Action for Taiwanese Application No. 109104253 dated Sep. 21, 2020, 15 pages.
Decision to Grant for Japanese Application No. 2021-547105 dated Jun. 12, 2023, 4 pages.
Decision to Grant for Russian Application No. 2021126817 dated Aug. 11, 2022, 19 pages.
Examination Report for Australian Application No. 2019428744 dated Jul. 25, 2022, 3 pages.
Notice of Acceptance for Australian Application No. 2019428744 dated Jun. 30, 2023, 3 pages.
Office Action for ARIPO Application No. AP/P/2021/013418 dated Jul. 24, 2023, 5 pages.
Office Action for Canadian Application No. 3,129,594 dated Oct. 17, 2023, 4 pages.
Office Action for Chilean Application No. 202102116 dated Oct. 18, 2023, 50 pages.
Office Action for Egyptian Application No. 1261/2021 dated Aug. 22, 2023, 6 pages.
Office Action for Korean Application No. 10-2021-7028614 dated Dec. 6, 2023, 16 pages.
Office Action for Saudi Arabia Application No. 521430047 dated Dec. 17, 2023, 15 pages.
Office Action for Singapore Application No. 11202108755U dated Aug. 4, 2023, 9 pages.
Office Action for Vietnamese Application No. 1-2021-05652 dated Aug. 14, 2023, 3 pages.
Office Action for Chinese Application No. 201980094749.8 dated Jan. 30, 2024, 12 pages.
Office Action for Egyptian Application No. 1261/2021 dated Jun. 10, 2024, 11 pages.

* cited by examiner

COMMUNICATION OF UPLINK CONTROL INFORMATION

CROSS-REFERENCE TO RELATED APPLICATIONS

The present application is a National Phase Entry under of International Patent Application No. PCT/CN2019/074999, filed Feb. 13, 2021 and entitled "COMMUNICATION OF UPLINK CONTROL INFORMATION," the entire disclosure of which is incorporated herein by reference in its entirety for all purposes.

FIELD

Embodiments of the present disclosure generally relate to the field of telecommunication and in particular, to communication of uplink control information.

BACKGROUND

Various wireless cellular communication systems have been implemented and are being implemented. In the communication systems, a terminal device communicates uplink information with a network device using an uplink grant provided by the network device. The uplink information includes uplink data and/or uplink control information. The uplink control information describes a state or condition of data buffer, power headroom, communication channels and/or or the like that is determined or monitored by the terminal device, which can be used to assist the network device in efficient scheduling and/or resource allocation.

SUMMARY

In general, example embodiments of the present disclosure provide a solution for communication of uplink control information.

In a first aspect, there is provided a method implemented at a terminal device. The method comprises obtaining a plurality of uplink grants available for uplink transmission to a network device, the plurality of uplink grants indicating resources for the uplink transmission; determining prioritization of the plurality of uplink grants in transmission of uplink control information based on a predetermined prioritization policy; and selecting, based on the determined prioritization, an uplink grant from the plurality of uplink grants for transmission of the uplink control information to the network device.

In a second aspect, there is provided a method implemented at a network device. The method comprises in response to determining that a plurality of uplink grants are expected to be available for uplink transmission from a terminal device, configuring the terminal device with a prioritization policy, the plurality of uplink grants indicating resources for the uplink transmission; and receiving uplink control information from the terminal device in the resources indicated by at least one of the plurality of uplink grants, the at least one uplink grant being selected by the terminal device based on prioritization of the plurality of uplink grants determined by applying the prioritization policy.

In a third aspect, there is provided an apparatus. The apparatus comprises at least one processor; and at least one memory including computer program codes; the at least one memory and the computer program codes are configured to, with the at least one processor, cause the apparatus to: obtain a plurality of uplink grants available for uplink transmission to a network device, the plurality of uplink grants indicating resources for the uplink transmission; determine prioritization of the plurality of uplink grants in transmission of uplink control information based on a predetermined prioritization policy; and select, based on the determined prioritization, an uplink grant from the plurality of uplink grants for transmission of the uplink control information to the network device.

In a fourth aspect, there is provided an apparatus. The apparatus comprises at least one processor; and at least one memory including computer program codes; the at least one memory and the computer program codes are configured to, with the at least one processor, cause the apparatus to: in response to determining that a plurality of uplink grants are expected to be available for uplink transmission from a terminal device, configure the terminal device with a prioritization policy, the plurality of uplink grants indicating resources for the uplink transmission; and receive uplink control information from the terminal device in the resources indicated by at least one of the plurality of uplink grants, the at least one uplink grant being selected by the terminal device based on prioritization of the plurality of uplink grants determined by applying the prioritization policy.

In a fifth aspect, there is provided an apparatus comprising means for performing steps of the method according to the above first aspect.

In a sixth aspect, there is provided an apparatus comprising means for performing steps of the method according to the above second aspect.

In a seventh aspect, there is provided a non-transitory computer readable medium comprising program instructions for causing an apparatus to perform at least the method according to the above first aspect.

In an eighth aspect, there is provided a non-transitory computer readable medium comprising program instructions for causing an apparatus to perform at least the method according to the above second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

DETAILED DESCRIPTION

Figure 1:
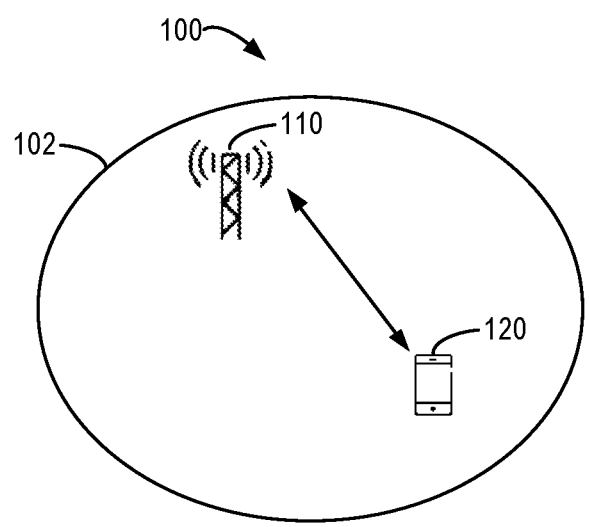
FIG. 1 illustrates an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second," and the like may be used herein to describe various elements, these elements should not be limited by these terms. These terms may refer to different or same elements. A first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "has," "having," "includes" and/or "including," when used herein, specify the presence of stated features, elements, and/or components etc., but do not preclude the presence or addition of one or more other features, elements, components and/or combinations thereof.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation of communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay (including Data Unit (DU) part of the integrated access and backhaul (IAB) node), a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), a relay (including Mobile Termination (MT) part of the integrated access and backhaul (IAB) node), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device," "communication device," "terminal," "user equipment" and "UE" may be used interchangeably.

FIG. 1 shows an example communication network 100 in which embodiments of the present disclosure can be implemented. The network 100 includes a network device 110 and a terminal device 120 served by the network device 110. The serving area of the network device 110 is called as a cell 102. It is to be understood that the number of network devices and terminal devices is only for the purpose of illustration without suggesting any limitations. The system 100 may include any suitable number of network devices and terminal devices adapted for implementing embodiments of the present disclosure. Although not shown, it would be appreciated that one or more terminal devices may be located in the cell 102 and served by the network device 110.

Communications in the communication system 100 may be implemented according to any proper communication protocol(s), comprising, but not limited to, cellular communication protocols of the first generation (1G), the second generation (2G), 2.5G, 2.75G, the third generation (3G), the fourth generation (4G), 4.5G, and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In the communication network 100, the network device 110 can communicate data and control information to the terminal device 120 and the terminal device 120 can also communicate data and control information to the network device 110. A link from the network device 110 to the terminal device 120 is referred to as a downlink (DL), while a link from the terminal device 120 to the network device 110 is referred to as an uplink (UL). In DL, the network device 110 is a transmitting (TX) device (or a transmitter) and the terminal device 120 is a receiving (RX) device (or a receiver). In UL, the terminal device 120 is a TX device (or a transmitter) and the network device 110 is a RX device (or a receiver).

In UL communications, uplink control information may be transmitted when being triggered, for example, using resources indicated by an available UL grant. Certain UL control information may be multiplexed in the granted resources which are scheduled for transmission of UL data. However, the multiplexed UL control information may not always be transmitted out from the terminal device. For example, in rebuilding Message 3 during a random access (RA) procedure, only the part of UL data, if rebuilt, is allowed to be transmitted, not the UL control information. The terminal device may perform intra-device prioritization on transmissions of UL data. The grant where the UL control information is multiplexed may be dropped when there is another grant with UL data with a higher priority to be transmitted at the same time. Furthermore, in a communication network operating on an unlicensed band, whether the UL transmission is performed may be based on a result of a listen-before-talk procedure if the UL grant is on the unlicensed band.

Currently, there may be a plurality of UL grants available for the terminal device and the UL control information can be transmitted using any of the UL grants. The plurality of UL grants may be available in the same carrier/serving cell or they may be available in different carriers/serving cells. Considering the possibility of being dropped, it is expected to select an appropriate UL grant for transmission of the UL control information. However, currently there is no such a solution for selecting the UL grant for the UL control information when there is more than one UL grant available at the same time for the terminal device.

According to an example embodiment, there is provided an improved solution for communication of UL control information. In an example embodiment, if a plurality of UL grants are available, the terminal device applies a prioritization policy to determine their prioritization in transmission of UL control information. An UL grant can be selected for transmission of the UL control information based on the determined prioritization. In such a way, the communication of the UL control information can be improved, and it is possible to increase a probability of transmission of the uplink control information and/or a probability of improving power efficiency of the terminal device.

Principle and example embodiments will now be described in detail below with reference to the accompanying drawings. However, those skilled in the art would readily appreciate that the detailed description given herein with respect to these drawings is for explanatory purpose as the present disclosure extends beyond theses limited embodiments.

Figure 2:
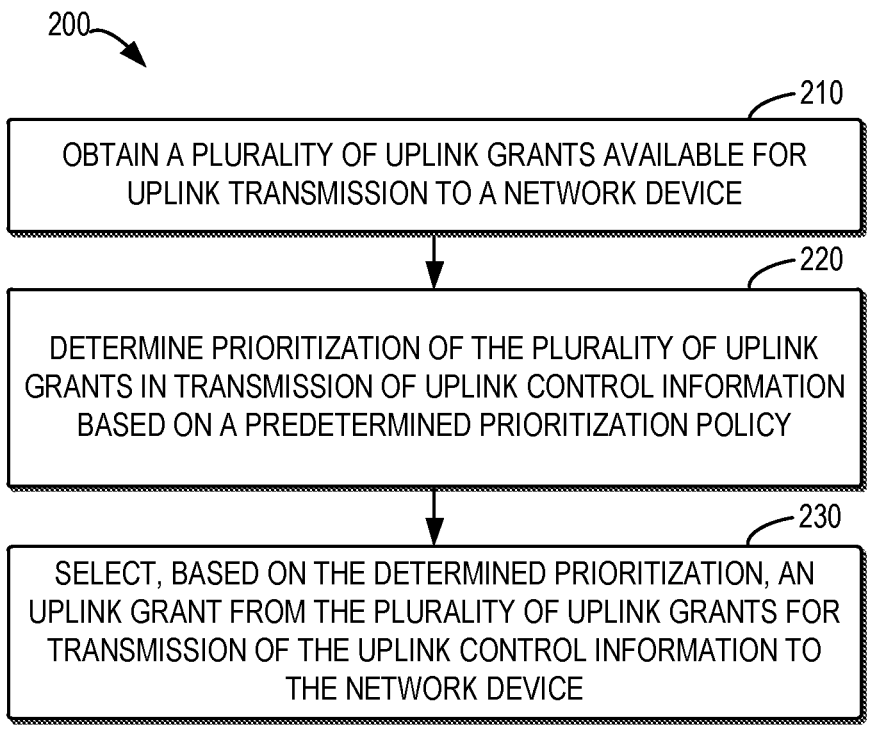
FIG. 2 illustrates a flowchart of a method implemented at a terminal device for communication of uplink control information in accordance with an example embodiment of the present disclosure.

Reference is first made to FIG. 2, which shows a method 200 for communication of uplink control information. The method 200 may be implemented at the terminal device 120 as illustrated in FIG. 1. For the purpose of discussion, example embodiments of the method 200 will be described with reference to FIG. 1.

At block 210, the terminal device 120 obtains a plurality of UL grants available for UL transmission to the network device 110. The UL grants may be scheduled or configured to the terminal device 120 by the network device 110. An UL grant may be scheduled in a dynamic manner, a semi-persistent/configured manner, and/or the like, and may indicate corresponding resources for the UL transmission. Based on the UL grant, the UE would know in which resource(s) it is scheduled for UL transmission. The UL grant may also indicate one or more parameters for transmission using the corresponding resources.

In an example embodiment, the plurality of UL grants are partially or totally overlapped in a time domain, which means that the resources indicated by the plurality of UL grants are at least partially overlapped in the time domain. That is, the plurality of UL grants are simultaneously available and thus collision in the time domain occurs. In an example embodiment, the resources indicated by some or all of the plurality of UL grants are different, which means that these resources may not be overlapped, for example, in a frequency domain, in a time domain, and/or other domain. In another example embodiment, the resources indicated by the plurality of UL grants may not be overlapped in both the time and frequency domain.

The terminal device 120 determines, at block 220, prioritization of the plurality of UL grants in transmission of UL control information based on a predetermined prioritization policy, and then selects at block 230 based on the determined prioritization an UL grant from the plurality of UL grants for transmission of the UL control information to the network device.

When the terminal device 120 detects that the plurality of UL grants are available, the terminal device 120 may determine which UL grant is to be used if the transmission of UL control information is triggered. As used herein, UL control information may indicate any type of control information that is to be transmitted in UL. In an example embodiment, the UL control information may be contained in a Medium Access Control Control Element (MAC CE). MAC CE may be a signaling message that is included within a MAC Protocol Data Unit (PDU) that is transmitted to the network device 110.

In an example embodiment, the UL control information may include a Buffer Status Report (BSR) and/or a Power Headroom Report (PHR). BSR is used to inform the network device 110 of an amount of UL data buffered for transmission so that the network device 110 can schedule transmission of the UL data accordingly. BSR may indicate respective amounts of UL data to be transmitted on different logical channels (LCHs), or a total amount of UL data to be transmitted on a set of LCHs or all the LCHs. PHR is used to inform the network device 110 of power situation of the terminal device 120 so that the network device 110 can decide whether to allocate more resources to the terminal device 120 or not. Other examples of UL control information may include, for instance, Configured Grant Confirmation and/or Recommended Bit Rate information. It would be appreciated that any other UL control information is also suitable.

The prioritization policy, which may also be referred to as a prioritization rule, indicates how the UL grants are ranked or prioritized for transmission of the UL control information. The prioritization policy may be predefined in the terminal device 120 or in the specification with which the terminal device 120 conforms, or may be configurable for example via upper layer signaling, such as Radio Resource Control (RRC) signaling from the network device 110. The prioritization policy may be configured for such a way that the probability of dropping or delaying the UL control information is decreased and/or the probability of skipping UL transmission for power saving is increased.

In an example embodiment, the prioritization policy is based on configuration of the UL grants. Thus, the prioritization of the plurality of UL grants varies depending on their configuration. Different aspects of the configuration of the UL grants may be considered, and for each aspect, the prioritization of one or more of the UL grants may be different. Some examples will be provided below for the configuration of the UL grants and how the prioritization of the UL grants is determined.

In an example embodiment, the configuration of the UL grants may be based on the respective Radio Network Temporary Identities (RNTIs) by which the plurality of UL grants are scheduled. The RNTI may be used to identify a terminal device. Thus, each of the UL grants may include a RNTI to identify the terminal device 120 to which the UL grant is scheduled. Different RNTIs may be allocated to the same terminal device in different communication procedures and/or for different purposes of transmissions. For example, the RNTIs may include a Cell RNTI (C-RNTI), a Random Access RNTI (RA-RNTI), Semi persistence Scheduling C-RNTI (SPS-C-RNTI), and/or the like.

In an example embodiment where the prioritization policy is based on the RNTIs of the UL grants, the terminal device 120 may prioritize one or more UL grants scheduled by a C-RNTI over one or more other UL grants scheduled by a RA-RNTI. The UL grant scheduled by the C-RNTI generally has a higher probability to be used for transmission as compared with the RA-RNTI assigned in the RA procedure. As such, the UL control information has a higher probability to be transmitted by multiplexing into the prioritized UL grant scheduled by C-RNTI.

In an example embodiment, to determine the prioritization of the UL grants, the terminal device 120 may prioritize one or more UL grants scheduled by a C-RNTI which is not used for successfully completing a RA procedure over one or more UL grants scheduled by a C-RNTI for successfully completing the RA procedure. In an UL grant scheduled by the C-RNTI for successfully completing the RA procedure, the UL control information may be multiplexed with UL data, for example, in Message 3 of the RA procedure. The UL control information may be dropped since only rebuilt UL data is allowed to be transmitted using the corresponding UL grant. Thus, such UL grant may have a lower priority for transmission of the UL control information so as to reduce the probability of dropping the UL control information.

The configuration of the plurality of UL grants may additionally or alternatively comprise priorities of UL data to be transmitted using the plurality of UL grants. Some UL grants are scheduled for transmission of different UL data and the different UL data may have respective priorities. The priorities of UL data may be configured or defined by the network device 110 based on various factors such as the services of the UL data. In the case that more than one UL grant is available, the terminal device 120 may perform intra-device prioritization to decide which UL data is to be transmitted and which UL data is to be dropped based on their priorities. To increase the probability of transmitting the UL control information, when determining the prioritization of the UL grants, the terminal device 120 may prioritize one or more UL grants scheduled for transmitting UL data with relatively higher priorities than priorities of UL data to be transmitted using other UL grants. It is noted that the priority of the UL data may refer to the priority of the LCH from which the UL data is multiplexed; and some of the UL grants may be restricted to be used by certain LCH(s) whereas some UL grants may be restricted to use another LCH(s), for instance.

In an example embodiment, the configuration of the plurality of UL grants may additionally or alternatively comprise types of frequency bands on which the resources indicated by the plurality of UL grants are allocated. The types of frequency bands may include a licensed frequency band and an unlicensed frequency band. Generally, although being allocated, a listen-before-talk (LBT) procedure may be performed on the unlicensed frequency band before the UL transmission. If the result of the LBT procedure indicates that the resources are currently available, the UL transmission can be performed. Otherwise, the UL information, including data and control information, may be dropped or delayed. In an example embodiment, if one or more of the UL grants indicate resources on the licensed frequency band(s) while one or more other UL grants indicate resources on the unlicensed frequency band(s), the terminal device 120 may prioritize the one or more UL grants on the licensed frequency band(s) over the one or more other UL grants on the unlicensed frequency bands.

The configuration of the plurality of UL grants may additionally or alternatively comprise data transmission availability in the plurality of UL grants. UL data to which one or more UL grants are scheduled may not be currently available for transmission and thus no UL data is to be transmitted using the corresponding UL grant(s). For example, one or more UL grants may be a configured grant(s) which indicate resources reserved for transmission of certain UL data. For example, UL grants may be configured for transmission of UL data of an Ultra Reliable and Low Latency Communication (URLLC) service, a massive Machine Type Communication (mMTC) service, an enhanced Mobile Broadband (eMBB) service, and/or the like. The UL data of the certain service may not always be available for each of the configured UL grans. In addition, the UL data may also be blocked from being transmitted, for example, according to a restriction on LCHs corresponding to the resources indicated by one or more UL grants.

In an example embodiment where the prioritization policy is based on data transmission availability, the terminal device 120 may determine the prioritization of the UL grants by prioritizing one or more UL grants with UL data available to be transmitted over one or more UL grants without UL data available to be transmitted. As such, the UL control information may have a lower probability to be transmitted using the UL grant(s) without UL data to be transmitted, which may in turn increase the probability for the terminal device 120 to skip UL information transmission completely on such UL grant(s). By skipping the transmission of UL grant(s) without UL data to be transmitted, it allows to save power or allocate more transmit power for other UL grants that are available simultaneously, increasing the probability for the UL control information transmission to be successful.

In some example embodiments, the configuration of the plurality of UL grants may additionally or alternatively comprise sub-carrier spacing (SCS), bandwidth parts (BWPs), and/or carrier frequencies associated with the plurality of UL grants. One or more of SCS, BWP, and carrier frequency may affect the probability of transmitting or dropping UL information to be transmitted using the corresponding UL grant.

SCS is associated with a type of numerology and may be related to configuration of the corresponding resources. Different UL grants may be configured with different SCS, such as one or more of 15 kHZ, 30 kHZ, 60 kHZ, 120 kHZ, 240 kHZ, and/or the like. In an example embodiment, by applying the prioritization policy is based on based on the SCS, the terminal device 120 may prioritize one or more UL grant with relatively lager SCS than SCS associated with other UL grants. In an example embodiment, the terminal device 120 may prioritize the UL grant with the largest SCS over all the other UL grants.

BWP is a part of system bandwidth activated for transmission. In an example embodiment, by applying the prioritization policy is based on based on the BWPs, the terminal device 120 may prioritize one or more UL grants with relatively lager BWP than BWP associated with other UL grants. In an example embodiment, the terminal device 120 may prioritize the UL grant with the largest BWP over all the other UL grants. In an example embodiment, the terminal device 120 may prioritize one or more UL grants with lower associated carrier frequencies than carrier frequencies associated with other UL grants.

In an example embodiment, in addition to the configuration of the plurality of UL grants or as an alternative, the prioritization policy may be based on types of the plurality of UL grants. The types of the UL grants may comprise a type of a semi-persistent scheduled (SPS) UL grant, which is also referred to as a Configured Grant Type 2, and a type of a dynamic UL grant, which is also referred to as a Configured Grant Type 1. In an example embodiment of applying such prioritization policy, the terminal device 120 may prioritize dynamic UL grant over a semi-persistent scheduled UL grant, or vice versa.

In an example embodiment, the prioritization policy may be based on a restriction on transmission of the UL control information. In an example embodiment, the restriction on transmission of the UL control information may indicate at least one LCH on which transmission of the UL control information is allowed. The UL control information may be specific to one or more LCHs. For example, UL control information with a recommended bit rate may be specific to one or more LCHs.

To determine the prioritization of the UL grants, the terminal device 120 may determine whether LCHs corresponding to the resources indicated by the plurality of UL grants are allowed for transmission of the UL control information based on the restriction. The terminal device 120 may then prioritize an UL grant with a LCH allowed for transmission of the UL control information over an UL grant with a LCH forbidden from transmission of the UL control information. As such, the UL grants that meet the restriction can be used to transmit the UL control information or may be prioritized over the other UL grants.

In an example embodiment, the restriction on transmission of the UL control information may additionally or alternatively indicate a restriction on SCS, transmission duration, cells, and/or the like. By applying the prioritization policy based on such restriction, the terminal device 120 may prioritize one or more UL grants that meet the restriction over the other UL grants. As such, the probability of transmission of the UL grants may be increased. The restriction may also be set such that resource isolation for certain types of UL data, such as UL data of a URLLC service with a predictable size and periodicity, preventing the corresponding scheduled UL grant(s) is used for transmitting non-relevant UL control information.

Various example embodiments of different prioritization policies and their application in the terminal device 120. A different prioritization policy may be based on one or a combination of more than one factor as mentioned above. By applying the prioritization policy, the terminal device 120 may be able to determine the prioritization of the UL grants in the transmission of the UL control information. It would be appreciated that the prioritization policies may be set in different manners based on the above mentioned factors and/or other factors.

One or more of the prioritization policies may be applied depending on a type of the UL control information, such as a type of BSR and a type of PHR. That is, the applied prioritization policy is specific to the type of the UL control information. For example, a prioritization policy based on the carrier frequency may be applied if transmission of BSR is triggered. As such, the UL grant with a lower carrier frequency is more likely to be used for transmission of BSR. A different prioritization policy based on the SCS may be applied if transmission of PHR is triggered. In this case, the UL grant with larger SCS may be used for transmission of PHR. As another example, Configured Grant Type 2 may have a lower priority in transmission of some type of UL control information. It would be appreciated that a different periodization policy (which may be based on a combination of different factors) may be applied for BSR, PHR, and/or other type of UL control information.

As mentioned above, a prioritization policy may be predefined in the terminal device 120 or may be configurable for example via upper layer signaling, such as RRC signaling from the network device 110. In an example embodiment, if more than one prioritization policy is predefined, the terminal device 120 may determine the applicability of the prioritization policy based on a characteristic of a radio configuration indicated by the network device 110. For example, the terminal device 120 may determine from being configured with a Configured UL grant, a restriction on transmission of the UL control information/UL data, and the like that the predefined prioritization policy is to be applied. In an example embodiment, the terminal device 120 may determine the prioritization policy to be applied in an explicit manner by receiving a corresponding indication from the network device 110. In such cases, the prioritization policy may be predefined in the terminal device 120. The network device 110 may transmit the prioritization policy to the terminal device 120 if the prioritization policy is not predefined in the terminal device 120. Example embodiments will be provided below to discuss in detail the configuration of the prioritization policy from the network device 110.

With the prioritization of the available UL grants determined, the terminal device 120 may select one or more UL grants for transmission of the UL control information based on the determined prioritization, as briefly mentioned above. The selected UL grant(s) may be indicated to an entity of the terminal device 120 that processes the UL control information. For example, the selected UL grant(s) may be indicated to a multiplexing and assembly entity to multiplex the UL control information into a packet to be transmitted using the resources indicated by the selected UL grant(s). In an example embodiment, the UL control information may be transmitted together with UL data scheduled on the resources. It would be appreciated that in some cases the UL control information may not be actually transmitted using the selected UL grant(s) due to other reasons.

In an example embodiment, the terminal device 120 may select one or more UL grants with the higher or highest priorities as compared to other UL grants. In an example embodiment, if both UL control information and UL data are to be transmitted using a same UL grant, their prioritization may be considered. Specifically, the terminal device 120 may determining a candidate UL grant from the plurality of UL grants based on the determined prioritization. The candidate UL grant may be the one with the higher or highest priority among the available UL grants. The terminal device 120 may further determine whether the UL control information is prioritized over UL data scheduled on the candidate UL grant, for example, based on prioritization between the UL control information and the UL data.

If the UL control information is prioritized over the UL data, the terminal device 120 may select the candidate UL grant as the UL grant for use. The terminal device 120 may determine the prioritization of the UL control information and the UL data in the case that the UL data fills up the resources indicated by the candidate UL grant. That is, the resources can only accommodate the UL data, and there is no space for transmitting the UL control information. In this case, the terminal device 120 may determine whether the UL data or the UL control information has the higher priority.

If the UL data is prioritized over the UL control information, the terminal device 120 may select a further candidate UL grant from other UL grants than the above candidate UL grant. For example, the terminal device 120 may select a UL grant having a second highest priority. For the further candidate UL grant, the terminal device 120 may perform a similar check to determine whether it can be selected for transmission of the UL control information.

The prioritization between UL control information and UL data may be predetermined by the terminal device 120 itself or written in the specification, or may be configured by the network device 110. In some example embodiments, the prioritization may be associated with one or more certain UL grant. For example, the UL control information may be determined or configured as being always prioritized over the UL data for certain UL grants. Alternatively, or in addition, the prioritization may be associated with one or more types of UL control information. The prioritization may be determined or configured as the same for all UL control information or all MAC CEs containing the UL control information. For example, UL data for the URLLC service may be prioritized over a type of UL control information, such as the UL control information with a recommended bit rate, but another type of UL control information such as PHR may be prioritized over the UL data for the URLLC service.

As an alternative, the prioritization may be determined or configured on a basis of individual types of UL control information or on a basis of individual MAC CEs. In an example embodiment, the prioritization between UL control information and UL data may be configured along with the configuration for a restriction on transmission of UL control information and/or UL data, such as a restriction on transmission in certain LCHs.

Figure 3:
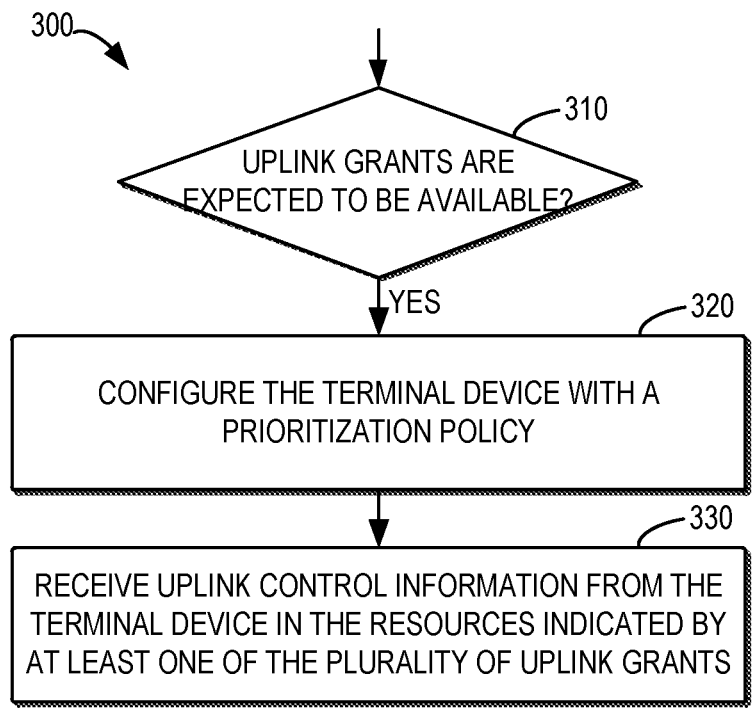
FIG. 3 illustrates a flowchart of a method implemented at a network device for communication of uplink control information in accordance with an example embodiment of the present disclosure.

FIG. 3 illustrates a flowchart of a method for communication of UL control information in accordance with an example embodiment of the present disclosure. The method 300 may be implemented at the network device 110 as illustrated in FIG. 1. For the purpose of discussion, example embodiments of the method 300 will be described with reference to FIG. 1. The network device 110 may initiates (re-)configuration of the prioritization policy to be applied at the terminal device 120.

At block 310, the network device 110 determines whether a plurality of UL grants are expected to be available for UL transmission from the terminal device 120. As mentioned above, more than one UL grant may be detected as being available for the terminal device 120 and/or has collision in the time domain.

If a plurality of UL grants are determined to be available for the terminal device 120, at block 320, the network device 110 configure the terminal device 120 with a prioritization policy. The network device 110 may transmit an indication of the prioritization policy or explicitly transmit the prioritization policy to the terminal device 120. In an example embodiment, the prioritization policy is configured based on a determination that UL transmission using at least one of the plurality of UL grants is expected to be dropped. Such dropping of UL transmission, including transmission of UL data and/or UL control information, is generally decided at the side of the terminal device 120. The probability of the UL transmission being dropped may result in potential dropping of the UL control information. In some cases, the transmission of the UL control information may be compromised to the transmission of the UL data due to the potential dropping in the terminal device 120. As such, in an example embodiment, if the network device 110 determines that the UL transmission is expected to be dropped by the terminal device 120, it may configure the terminal device 120 with the prioritization policy so as to increase the probability of transmitting of the UL control information and/or the probability of skipping some UL transmission for power saving.

In an example embodiment, the network device 110 may determine if a restriction on transmission of the UL control information and/or UL data is configured to the terminal device 120 and/or UL grants with different configurations are allocated to the terminal device 120. If the restriction is configured and/or the UL grants with different configurations are allocated, the network device 110 may configure the prioritization policy to the terminal device 120 such that the terminal device 120 can select one or more appropriate UL grants for transmission of the UL control information.

The terminal device 120 may determine prioritization of the plurality of UL grants if it also detects that these UL grants are available and select at least one UL grant for transmission of UL control information, as discussed above. At block 330, the network device 110 receives the UL control information from the terminal device in the resources indicated by at least one of the plurality of UL grants.

In an example embodiment, an apparatus capable of performing the method 200 (for example, the terminal device 120) may comprise means for performing the respective steps of the method 200. The means may be implemented in any suitable form. For example, the means may be implemented in a circuitry or software module.

In an example embodiment, the apparatus comprises means for means for obtaining a plurality of uplink grants available for uplink transmission to a network device, the plurality of uplink grants indicating resources for the uplink transmission; means for determining prioritization of the plurality of uplink grants in transmission of uplink control information based on a predetermined prioritization policy; and means for selecting, based on the determined prioritization, an uplink grant from the plurality of uplink grants for transmission of the uplink control information to the network device.

In an example embodiment, the apparatus further comprises means for performing other steps in an example embodiment of the method 200. In an example embodiment, the means comprises at least one processor; and at least one memory including computer program code, the at least one memory and computer program code configured to, with the at least one processor, cause the performance of the apparatus.

In an example embodiment, an apparatus capable of performing the method 300 (for example, the network device 110) may comprise means for performing the respective steps of the method 300. The means may be implemented in any suitable form. For example, the means may be implemented in a circuitry or software module.

In an example embodiment, the apparatus comprises means for configuring, in response to determining that a plurality of uplink grants are expected to be available for uplink transmission from a terminal device, the terminal device with a prioritization policy, the plurality of uplink grants indicating resources for the uplink transmission; and means for receiving uplink control information from the terminal device in the resources indicated by at least one of the plurality of uplink grants, the at least one uplink grant being selected by the terminal device based on prioritization of the plurality of uplink grants determined by applying the prioritization policy.

In an example embodiment, the apparatus further comprises means for performing other steps in an example embodiment of the method 300. In an example embodiment, the means comprises at least one processor; and at least one memory including computer program code, the at least one memory and computer program code configured to, with the at least one processor, cause the performance of the apparatus.

Figure 4:
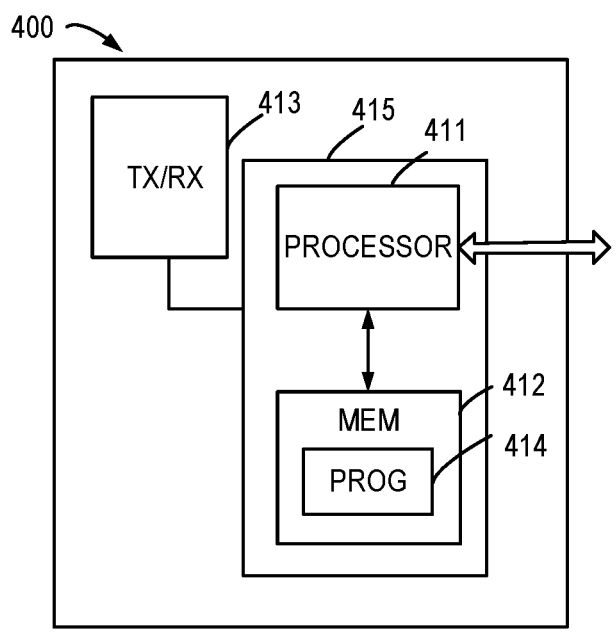
FIG. 4 illustrates a simplified block diagram of an apparatus that is suitable for implementing embodiments of the present disclosure.

FIG. 4 illustrates a simplified block diagram of an apparatus 400 that can be embodied as or comprised in the terminal device 120 or the network device 110 shown in FIG. 1, to implement example embodiments of the present disclosure.

The apparatus 400 comprises at least one processor 411, such as a data processor (DP) and at least one memory (MEM) 412 coupled to the processor 411. The apparatus 99 may further include a transmitter TX and receiver RX 413 coupled to the processor 411, which may be operable to communicatively connect to other apparatuses. The MEM 412 stores a program or computer program code 414. The at least one memory 412 and the computer program code 414 are configured to, with the at least one processor 411, cause the apparatus 400 at least to perform in accordance with embodiments of the present disclosure, for example the method 200 or 300.

A combination of the at least one processor 411 and the at least one MEM 412 may form processing means 415 configured to implement various embodiments of the present disclosure. Various embodiments of the present disclosure may be implemented by computer program executable by the processor 411, software, firmware, hardware or in a combination thereof.

The MEM 412 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processor 411 may be of any type suitable to the local technical environment, and may include one or more of general purpose computers, special purpose computers, microprocessors, digital signal processors (DSPs) and processors based on multicore processor architecture, as non-limiting examples.

Although some of the above descriptions are made in the context of a wireless communication system shown in FIG. 1, it should not be construed as limiting the spirit and scope of the present disclosure. The principle and concept of the present disclosure may be more generally applicable to other scenarios.

In addition, the present disclosure may also provide a carrier containing the computer program as mentioned above (e.g., computer instructions/grogram code 414 in FIG. 4). The carrier includes a computer readable storage medium and a transmission medium. The computer readable storage medium may include, for example, an optical compact disk or an electronic memory device like a RAM (random access memory), a ROM (read only memory), Flash memory, magnetic tape, CD-ROM, DVD, Blue-ray disc and the like. The transmission medium may include, for example, electrical, optical, radio, acoustical or other form of propagated signals, such as carrier waves, infrared signals, and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 or 300 as described above with reference to FIGS. 2 and 3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

For the purpose of the present disclosure as described herein above, it should be noted that, method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the example embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present disclosure is restricted thereto. Rather, it is the intention that all variations and modifications be included which fall within the spirit and scope of the appended claims.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various embodiments of the techniques have been described. In addition to or as an alternative to the above, the following examples are described. The features described in any of the following examples may be utilized with any of the other examples described herein.

What is claimed is:

1. A method implemented at a terminal device, comprising:
    obtaining a plurality of uplink grants available for uplink transmission to a network device, the plurality of uplink grants indicating resources for the uplink transmission;
    determining prioritization of the plurality of uplink grants in transmission of uplink control information based on a predetermined prioritization policy, wherein the predetermined prioritization policy is based on data transmission availability, wherein an uplink grant with uplink data available to be transmitted is prioritized over an uplink grant without uplink data available to be transmitted; and
    selecting, based on the determined prioritization, an uplink grant from the plurality of uplink grants for transmission of the uplink control information to the network device.

2. The method of claim 1, wherein the prioritization policy is specific to a type of the uplink control information.

3. The method of claim 1, wherein the prioritization policy is based on at least one of the following:
    configuration of the plurality of uplink grants,
    types of the plurality of uplink grants, or
    a restriction on transmission of the uplink control information.

4. The method of claim 3, wherein the configuration of the plurality of uplink grants comprises radio network temporary identities by which the plurality of uplink grants are scheduled, and wherein determining the prioritization of the plurality of uplink grants comprises one or more of:
    prioritizing an uplink grant scheduled by a cell radio network temporary identity over an uplink grant scheduled by a random access radio network temporary identity, or
    prioritizing an uplink grant scheduled by a cell radio network temporary identity not for successfully completing a random access procedure over an uplink grant scheduled by a cell radio network temporary identity for successfully completing the random access procedure.

5. The method of claim 3, wherein the configuration of the plurality of uplink grants comprises priorities of uplink data to be transmitted using the plurality of uplink grants, and wherein determining the prioritization of the plurality of uplink grants comprises:
    prioritizing an uplink grant for transmitting uplink data with a higher priority than priorities of uplink data to be transmitted using other uplink grants.

6. The method of claim 3, wherein the configuration of the plurality of uplink grants comprises types of frequency bands on which the resources indicated by the plurality of uplink grants are allocated, and wherein determining the prioritization of the plurality of uplink grants comprises:
    prioritizing an uplink grant with resources allocated on a licensed frequency band over an uplink grant with resources allocated on an unlicensed frequency band.

7. The method of claim 1, wherein data transmission availability is according to a restriction on logical channels corresponding to resources indicated by the plurality of uplink grants.

8. The method of claim 3, wherein the configuration of the plurality of uplink grants comprises one or more of: sub-carrier spacing, bandwidth parts, or carrier frequencies associated with the plurality of uplink grants, and wherein determining the prioritization of the plurality of uplink grants comprises performing at least one of the following:
    prioritizing an uplink grant with larger associated sub-carrier spacing than sub-carrier spacing associated with other uplink grants;
    prioritizing an uplink grant with a larger associated bandwidth part than bandwidth parts associated with other uplink grants; or
    prioritizing an uplink grant with a lower associated carrier frequency than carrier frequencies associated with other uplink grants.

9. The method of claim 3, wherein the types of the plurality of uplink grants comprise a type of a semi-persistent scheduled uplink grant and a type of a dynamic uplink grant, and wherein determining the prioritization of the plurality of uplink grants comprises:
    prioritizing a dynamic uplink grant over a semi-persistent scheduled uplink grant.

10. The method of claim 3, wherein the restriction on transmission of the uplink control information indicates at least one logical channel on which transmission of the uplink control information is allowed, and wherein determining the prioritization of the plurality of uplink grants comprises:
    determining, based on the restriction, whether logical channels corresponding to the resources indicated by the plurality of uplink grants are allowed for transmission of the uplink control information; and
    prioritizing an uplink grant with a logical channel allowed for transmission of the uplink control information over an uplink grant with a logical channel forbidden from transmission of the uplink control information.

11. The method of claim 1, wherein selecting the uplink grant further comprises:
    determining a candidate uplink grant from the plurality of uplink grants based on the determined prioritization;
    determining whether the uplink control information is prioritized over uplink data based on prioritization between the uplink control information and the uplink data, the uplink data being scheduled to be transmitted using the candidate uplink grant; and
    in response to the uplink control information is prioritized over the uplink data, selecting the candidate uplink grant as the uplink grant.

12. The method of claim 11, wherein determining whether the uplink control information is prioritized over the uplink data comprises:
    in response to the uplink data filling up the resources indicated by the candidate uplink grant, determining whether the uplink control information is prioritized over the uplink data.

13. The method of claim 1, wherein the uplink control information is contained in a media access control (MAC) control element; and
  wherein the uplink control information comprises at least one of a buffer status report and a power headroom report.

14. The method of claim 1, wherein the prioritization policy is applied based on an indication from the network device, or
  wherein the prioritization policy is applied based on a characteristic of a radio configuration from the network device.

15. A method implemented at a network device, comprising:
  in response to determining that a plurality of uplink grants are expected to be available for uplink transmission from a terminal device, configuring the terminal device with a prioritization policy, wherein the prioritization policy is based on data transmission availability, wherein an uplink grant with uplink data available to be transmitted is prioritized over an uplink grant without uplink data available to be transmitted, the plurality of uplink grants indicating resources for the uplink transmission; and
  receiving uplink control information from the terminal device in the resources indicated by at least one of the plurality of uplink grants, the at least one uplink grant being selected by the terminal device based on prioritization of the plurality of uplink grants determined by applying the prioritization policy.

16. An apparatus, comprising:
  at least one processor; and
  at least one memory including computer program codes;
  the at least one memory and the computer program codes are configured to, with the at least one processor, cause the apparatus to:
    obtain a plurality of uplink grants available for uplink transmission to a network device, the plurality of uplink grants indicating resources for the uplink transmission;
    determine prioritization of the plurality of uplink grants in transmission of uplink control information based on a predetermined prioritization policy, wherein the predetermined prioritization policy is based on data transmission availability, wherein an uplink grant with uplink data available to be transmitted is prioritized over an uplink grant without uplink data available to be transmitted; and
    select, based on the determined prioritization, an uplink grant from the plurality of uplink grants for transmission of the uplink control information to the network device.

17. The apparatus of claim 16, wherein the prioritization policy is specific to a type of the uplink control information.

18. The apparatus of claim 16, wherein the prioritization policy is based on at least one of the following:
  configuration of the plurality of uplink grants,
  types of the plurality of uplink grants, and
  a restriction on transmission of the uplink control information.

19. The apparatus of claim 18, wherein the configuration of the plurality of uplink grants comprises radio network temporary identities by which the plurality of uplink grants are scheduled, and wherein the apparatus is caused to determine the prioritization of the plurality of uplink grants by one or more of:
  prioritizing an uplink grant scheduled by a cell radio network temporary identity over an uplink grant scheduled by a random access radio network temporary identity, or
  prioritizing an uplink grant scheduled by a cell radio network temporary identity not for successfully completing a random access procedure over an uplink grant scheduled by a cell radio network temporary identity for successfully completing the random access procedure.

20. The apparatus of claim 18, wherein the configuration of the plurality of uplink grants comprises priorities of uplink data to be transmitted using the plurality of uplink grants, and wherein the apparatus is caused to determine the prioritization of the plurality of uplink grants by:
  prioritizing an uplink grant for transmitting uplink data with a higher priority than priorities of uplink data to be transmitted using other uplink grants.

21. The apparatus of claim 18, wherein the configuration of the plurality of uplink grants comprises types of frequency bands on which the resources indicated by the plurality of uplink grants are allocated, and wherein the apparatus is caused to determine the prioritization of the plurality of uplink grants by:
  prioritizing an uplink grant with resources allocated on a licensed frequency band over an uplink grant with resources allocated on an unlicensed frequency band.

22. The apparatus of claim 16, wherein data transmission availability is according to a restriction on logical channels corresponding to resources indicated by the plurality of uplink grants.

23. The apparatus of claim 18, wherein the configuration of the plurality of uplink grants comprises one or more of: sub-carrier spacing, bandwidth parts, or carrier frequencies associated with the plurality of uplink grants, and wherein the apparatus is caused to determine the prioritization of the plurality of uplink grants by performing at least one of the following:
  prioritizing an uplink grant with larger associated sub-carrier spacing than sub-carrier spacing associated with other uplink grants;
  prioritizing an uplink grant with a larger associated bandwidth part than bandwidth parts associated with other uplink grants; or
  prioritizing an uplink grant with a lower associated carrier frequency than carrier frequencies associated with other uplink grants.

24. The apparatus of claim 18, wherein the types of the plurality of uplink grants comprise a type of a semi-persistent scheduled uplink grant and a type of a dynamic uplink grant, and wherein the apparatus is caused to determine the prioritization of the plurality of uplink grants by:
  prioritizing a dynamic uplink grant over a semi-persistent scheduled uplink grant.

25. The apparatus of claim 18, wherein the restriction on transmission of the uplink control information indicates at least one logical channel on which transmission of the uplink control information is allowed, and wherein the apparatus is caused to determine the prioritization of the plurality of uplink grants by:
  determining, based on the restriction, whether logical channels corresponding to the resources indicated by the plurality of uplink grants are allowed for transmission of the uplink control information; and
  prioritizing an uplink grant with a logical channel allowed for transmission of the uplink control information over an uplink grant with a logical channel forbidden from transmission of the uplink control information.

26. The apparatus of claim 16, wherein the apparatus is caused to:
determine a candidate uplink grant from the plurality of uplink grants based on the determined prioritization;
determine whether the uplink control information is prioritized over uplink data based on prioritization between the uplink control information and the uplink data, the uplink data being scheduled to be transmitted using the candidate uplink grant; and
in response to the uplink control information is prioritized over the uplink data, select the candidate uplink grant as the uplink grant.

27. The apparatus of claim 26, wherein the apparatus is caused to:
in response to the uplink data filling up the resources indicated by the candidate uplink grant, determine whether the uplink control information is prioritized over the uplink data.

28. The apparatus of claim 16, wherein the uplink control information is contained in a media access control (MAC) control element; and
wherein the uplink control information comprises at least one of a buffer status report and a power headroom report.

29. The apparatus of claim 16, wherein the prioritization policy is applied based on an indication from the network device, or
wherein the prioritization policy is applied based on a characteristic of a radio configuration from the network device.

30. An apparatus, comprising:
at least one processor; and
at least one memory including computer program codes;
the at least one memory and the computer program codes are configured to, with the at least one processor, cause the apparatus to:
in response to determining that a plurality of uplink grants are expected to be available for uplink transmission from a terminal device, configure the terminal device with a prioritization policy, the plurality of uplink grants indicating resources for the uplink transmission, wherein the prioritization policy is based on data transmission availability, wherein an uplink grant with uplink data available to be transmitted is prioritized over an uplink grant without uplink data available to be transmitted; and
receive uplink control information from the terminal device in the resources indicated by at least one of the plurality of uplink grants, the at least one uplink grant being selected by the terminal device based on prioritization of the plurality of uplink grants determined by applying the prioritization policy.

31. A non-transitory computer readable medium comprising program instructions for causing an apparatus to perform at least:
obtaining a plurality of uplink grants available for uplink transmission to a network device, the plurality of uplink grants indicating resources for the uplink transmission;
determining prioritization of the plurality of uplink grants in transmission of uplink control information based on a predetermined prioritization policy, wherein the predetermined prioritization policy is based on data transmission availability, wherein an uplink grant with uplink data available to be transmitted is prioritized over an uplink grant without uplink data available to be transmitted; and
selecting, based on the determined prioritization, an uplink grant from the plurality of uplink grants for transmission of the uplink control information to the network device.

32. A non-transitory computer readable medium comprising program instructions for causing an apparatus to perform at least:
in response to determining that a plurality of uplink grants are expected to be available for uplink transmission from a terminal device, configuring the terminal device with a prioritization policy, wherein the prioritization policy is based on data transmission availability, wherein an uplink grant with uplink data available to be transmitted is prioritized over an uplink grant without uplink data available to be transmitted, the plurality of uplink grants indicating resources for the uplink transmission; and
receiving uplink control information from the terminal device in the resources indicated by at least one of the plurality of uplink grants, the at least one uplink grant being selected by the terminal device based on prioritization of the plurality of uplink grants determined by applying the prioritization policy.

* * * * *